(12) United States Patent
Park et al.

(10) Patent No.: US 11,152,662 B2
(45) Date of Patent: Oct. 19, 2021

(54) BATTERY PACK INCLUDING PACK HOUSING

(71) Applicant: LG CHEM, LTD., Seoul (KR)

(72) Inventors: Chang-Wook Park, Daejeon (KR); Kun-Joo Yang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 16/646,820

(22) PCT Filed: Jan. 25, 2019

(86) PCT No.: PCT/KR2019/001110
§ 371 (c)(1),
(2) Date: Mar. 12, 2020

(87) PCT Pub. No.: WO2019/198919
PCT Pub. Date: Oct. 17, 2019

(65) Prior Publication Data
US 2020/0280035 A1 Sep. 3, 2020

(30) Foreign Application Priority Data
Apr. 9, 2018 (KR) .......................... 10-2018-0041108

(51) Int. Cl.
*H01M 50/20* (2021.01)
*H01M 50/30* (2021.01)
(Continued)

(52) U.S. Cl.
CPC ........... *H01M 50/20* (2021.01); *H01M 10/62* (2015.04); *H01M 50/107* (2021.01);
(Continued)

(58) Field of Classification Search
CPC ...... H01M 10/62; H01M 50/20; H01M 50/30; H01M 50/107; H01M 50/182; H01M 50/0183
See application file for complete search history.

(56) References Cited

U.S. PATENT DOCUMENTS 9,350,057 B2 5/2016 Yang
2007/0141451 A1 6/2007 Marukawa et al.
(Continued)

FOREIGN PATENT DOCUMENTS

JP 2001-223035 A 8/2001
JP 2005-302698 A 10/2005
(Continued)

OTHER PUBLICATIONS

Machine Translation of: JP 2010/140788 A, Kobayashi et al., Jun. 24, 2010.*
(Continued)

*Primary Examiner* — Kenneth J Douyette
(74) *Attorney, Agent, or Firm* — Morgan, Lewis & Bockius LLP

(57) ABSTRACT

Provided is a battery pack capable of preventing an ignition or explosion of a battery cell by including a pack housing having the inside that is in a negative pressure state. The battery pack includes: at least one battery module including a plurality of battery cells and a module case having an accommodating space to accommodate the plurality of battery cells therein; and a pack housing including an upper case that has an internal structure to cover a top portion of the at least one battery module and includes a cover portion having an external structure having a curved surface entirely from one end to the other end, and a lower case that has an internal structure to surround a bottom portion of the at least one battery module and includes a mounting portion having an external structure having a curved surface entirely from
(Continued)

one end to the other end, wherein the upper case and the lower case are combined with each other and sealed to maintain an inside of the pack housing in a negative pressure state.

10 Claims, 13 Drawing Sheets

(51) Int. Cl.
*H01M 50/107* (2021.01)
*H01M 50/148* (2021.01)
*H01M 10/62* (2014.01)
*H01M 50/183* (2021.01)

(52) U.S. Cl.
CPC ....... *H01M 50/148* (2021.01); *H01M 50/183* (2021.01); *H01M 50/30* (2021.01); *H01M 2200/00* (2013.01); *H01M 2220/10* (2013.01)

(56) References Cited

U.S. PATENT DOCUMENTS

| | | |
|---|---|---|
| 2012/0082875 A1 | 4/2012 | Watanabe et al. |
| 2012/0086176 A1 | 4/2012 | Kondou et al. |
| 2012/0141851 A1 | 6/2012 | Hou et al. |
| 2013/0252058 A1 | 9/2013 | Kim |
| 2014/0220412 A1 | 8/2014 | Lee et al. |
| 2016/0049706 A1 | 2/2016 | Kerspe et al. |
| 2018/0040863 A1 | 2/2018 | Kim et al. |

FOREIGN PATENT DOCUMENTS

| | | |
|---|---|---|
| JP | 2007-172937 A | 7/2007 |
| JP | 2010-140788 A | 6/2010 |
| JP | 2011-40314 A | 2/2011 |
| JP | 2012-79511 A | 4/2012 |
| JP | 2012097896 A | 5/2012 |
| JP | 2016-119248 A | 6/2016 |
| JP | 6265952 B2 | 1/2018 |
| JP | 2018507523 A | 3/2018 |
| KR | 10-2013-0107790 A | 10/2013 |
| KR | 10-1430620 B1 | 8/2014 |
| KR | 10-2016-0054326 A | 5/2016 |
| KR | 10-2016-0129596 A | 11/2016 |
| WO | WO 2016/175590 A1 * | 11/2016 |

OTHER PUBLICATIONS

International Search Report issued in corresponding International Patent Application No. PCT/KR2019/001110 dated May 10, 2019.
Extended European Search Report issued in corresponding European Patent Application No. 19786077.8 dated Jan. 29, 2021. Note: JP 2010-140788 cited therein is already of record.
First Office Action dated May 10, 2021, issued in corresponding Japanese Patent Application No. 2020-515254. Note: JP 2010-140788-A cited therein is already of record.

\* cited by examiner

BATTERY PACK INCLUDING PACK HOUSING

TECHNICAL FIELD

The present disclosure relates to a battery pack including a pack housing, and more particularly, to a battery pack capable of preventing an ignition or explosion of a battery cell by including a pack housing having an inside that is in a negative pressure state.

The present application claims priority to Korean Patent Application No. 10-2018-0041108 filed on Apr. 9, 2018 in the Republic of Korea, the disclosures of which are incorporated herein by reference.

BACKGROUND ART

Currently commercialized secondary batteries include nickel cadmium batteries, nickel hydrogen batteries, nickel zinc batteries, lithium secondary batteries, etc. and the lithium secondary batteries thereamong are receiving attention according advantages of free charging/discharging, a very low self-discharge rate, and high energy density since a memory effect is barely generated compared to nickel-based secondary batteries.

Such a lithium secondary battery mainly uses a lithium-based oxide and a carbon material respectively as a positive electrode active material and a negative electrode active material. The lithium secondary battery includes an electrode assembly, in which a positive electrode plate and a negative electrode plate on which the positive electrode active material and the negative electrode active material are respectively coated are arranged with a separator therebetween, and an exterior material, i.e., a battery pouch exterior material, sealing and accommodating the electrode assembly with an electrolyte solution.

Generally, the lithium secondary battery may be classified into a can type secondary battery, in which the electrode assembly is embedded in a metal can, and a pouch type secondary battery, in which the electrode assembly is embedded in a pouch of an aluminum laminate sheet, based on a shape of the exterior material.

Recently, the lithium secondary battery is widely used not only in a small-sized apparatus, such as a portable electronic device, but also in medium- and large-sized apparatuses, such as a vehicle or a power storage apparatus. When used in the medium- and large-sized apparatuses, a large number of lithium secondary batteries are electrically connected to increase capacity and output. In particular, a pouch type lithium secondary battery is widely used in the medium- and large-sized apparatuses due to easy stacking.

Meanwhile, in the related art, when a battery pack is configured by electrically connecting the plurality of lithium secondary batteries, it is generally known to manufacture the battery pack by first configuring a battery module including the plurality of lithium secondary batteries, and then mounting the battery module on a pack housing together with electronic components.

However, since the lithium secondary battery has an explosion hazard when overheated, securing safety is one of important issues. The lithium secondary battery is overheated due to various reasons, and one of the reasons is an overcurrent over the limit flowing through the lithium secondary battery.

When the overcurrent flows, the lithium secondary battery is heated by joule heat, and thus an internal temperature of the lithium secondary battery is rapidly increased. Such a rapid increase in the temperature causes a decomposition reaction of the electrolyte solution and causes thermal runaway, and as a result, explosion of the lithium secondary battery may be caused.

In particular, the battery pack including the plurality of lithium secondary batteries has a very high risk. In other words, when even one lithium secondary battery is ignited among the plurality of lithium secondary batteries in the battery pack, a chain ignition or explosion may occur in adjacent lithium secondary batteries, resulting in a serious safety problem.

DISCLOSURE

Technical Problem

The present disclosure is designed to solve the problems of the related art, and therefore the present disclosure is directed to providing a battery pack capable of preventing an ignition or explosion of a battery cell by including a pack housing having the inside that is in a negative pressure state.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack including: at least one battery module including a plurality of battery cells and a module case having an accommodating space to accommodate the plurality of battery cells therein; and a pack housing including an upper case that has an internal structure to cover a top portion of the at least one battery module and includes a cover portion having an external structure having a curved surface entirely from one end to the other end, and a lower case that has an internal structure to surround a bottom portion of the at least one battery module and includes a mounting portion having an external structure having a curved surface entirely from one end to the other end, wherein the upper case and the lower case are combined with each other and sealed to maintain the inside thereof in a negative pressure state.

Also, the upper case may include a first edge portion provided along a bottom end surface of the cover portion and protruding and extending in an outward direction, and the lower case may include a second edge portion provided along a top end surface of the mounting portion and protruding and extending in the outward direction.

Moreover, the first edge portion and the second edge portion may be combined to each other to maintain the inside of the pack housing in a negative pressure state.

In addition, the upper case may include a rib protruding and extending from an outer surface of an external structure of the upper case, having one side in a horizontal direction connected to an outer surface of the cover portion, and having a bottom end portion connected to a top surface of a portion of the first edge portion protruding in the outward direction.

Also, the lower case may include a rib protruding and extending from an outer surface of an external structure of the lower case, having one side in the horizontal direction connected to an outer surface of the mounting portion, and having a top end portion connected to a bottom surface of a portion of the second edge portion protruding in the outward direction.

Moreover, the upper case may include a fastening hole configured to be bolted, the module case may include a through hole into which a bolt is inserted, and the lower case may include a fastening groove at a location corresponding to the fastening hole in an up-and-down direction.

In addition, the battery pack may further include at least one long bolt configured to combine and fix the upper case, the at least one battery module, and the lower case to each other.

Also, the pack housing may further include a gasket provided between the first edge portion of the upper case and the second edge portion of the lower case.

Moreover, the first edge portion and the second edge portion may each include an insertion groove into which a region of the gasket is inserted.

In addition, a vent hole connected to a suction hose of a vacuum pump or sealed by a cap to prevent inflow of external air may be provided at the pack housing.

In another aspect of the present disclosure, there is also provided a device including the battery pack.

In another aspect of the present disclosure, there is also provided an energy storage system including the device.

Advantageous Effects

According to an aspect of the present disclosure, a battery module of the present disclosure can effectively prevent deformation of a pack housing caused by negative pressure when the inside of the sealed pack housing is in a negative pressure state, because the pack housing includes an upper case and a lower case respectively including a cover portion and a mounting portion, each of which includes a curved surface entirely on an outer structure.

Also, according to an aspect of the present disclosure, the battery module can be stably fixed inside the pack housing by forming a support portion at an internal structure of each of the upper case and the lower case. Moreover, the support portion of the upper case and the support portion of the lower case support a plurality of battery modules while the plurality of battery modules are provided therebetween, and thus the deformation of the pack housing can be prevented and the durability of the battery pack can be improved. Moreover, the pack housing presses the plurality of battery modules in an inward direction through the support portions, and thus a swelling phenomenon caused by charging and discharging of the battery module can be suppressed.

Moreover, according to an aspect of the present disclosure, since the battery pack of the present disclosure includes at least one long bolt configured to combine and fix the upper case, the battery module, and the lower case together, not only coupling of the upper case and the lower case can be stably maintained, but also the plurality of battery modules accommodated inside the pack housing can be pressed and fixed in an up-and-down direction by the upper case and the lower case, thereby effectively preventing movement of the battery module inside the pack housing.

Also, according to an aspect of the present disclosure, rigidity of a region of the pack housing having weak mechanical rigidity can be supplemented by forming a rib for rigidity reinforcement at each of the upper case and the lower case, and thus durability of a product can be effectively improved.

Furthermore, according to an aspect of the present disclosure, a gasket can be stably fixed between a first edge portion and a second edge portion of the pack housing by forming an insertion groove at each of the first edge portion and the second edge portion, and thus the gasket can be effectively prevented from being detached from the pack housing or from being deformed or damaged.

Also, according to an aspect of the present disclosure, since the inside of the pack housing maintains a state in which air is discharged by a vacuum pump, the inside of the pack housing can maintain an anaerobic state in which oxygen is relatively less than the outside, and thus the battery cells embedded in the battery module can be prevented from being ignited or exploded due to an abnormal operation or the like.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
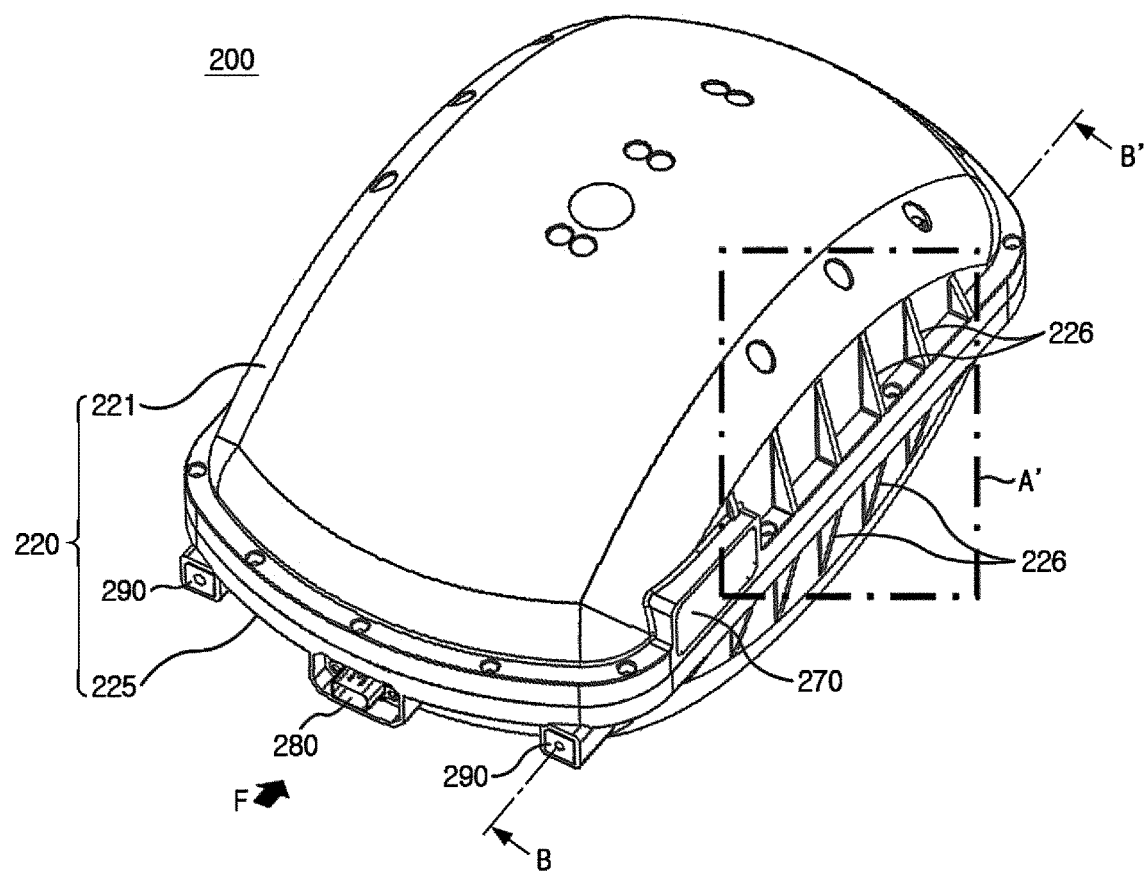
FIG. 1 is a perspective view schematically showing a battery pack according to an embodiment of the present disclosure.
Figure 2:
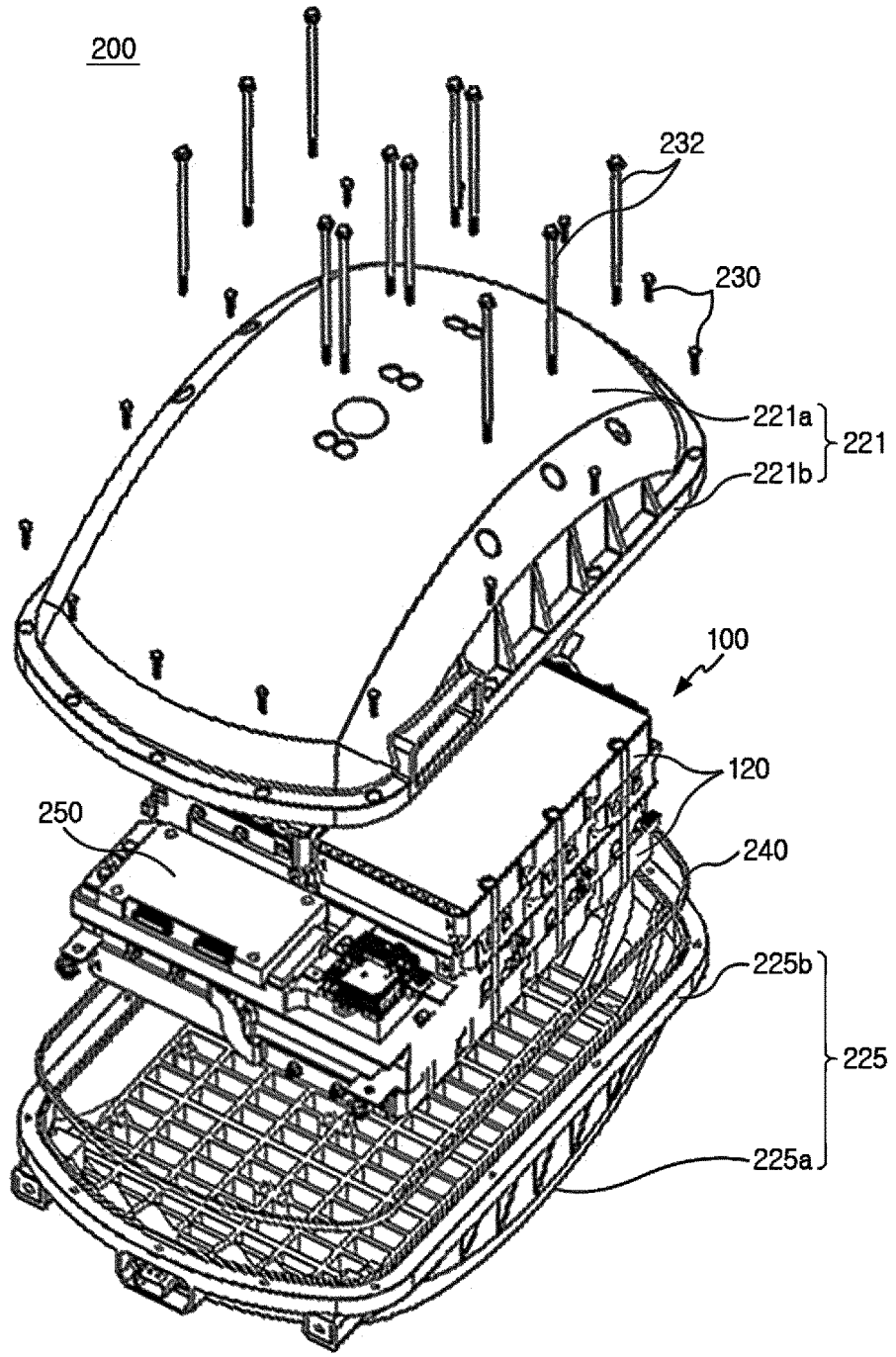
FIG. 2 is an exploded perspective view schematically showing a battery pack according to an embodiment of the present disclosure.
Figure 3:
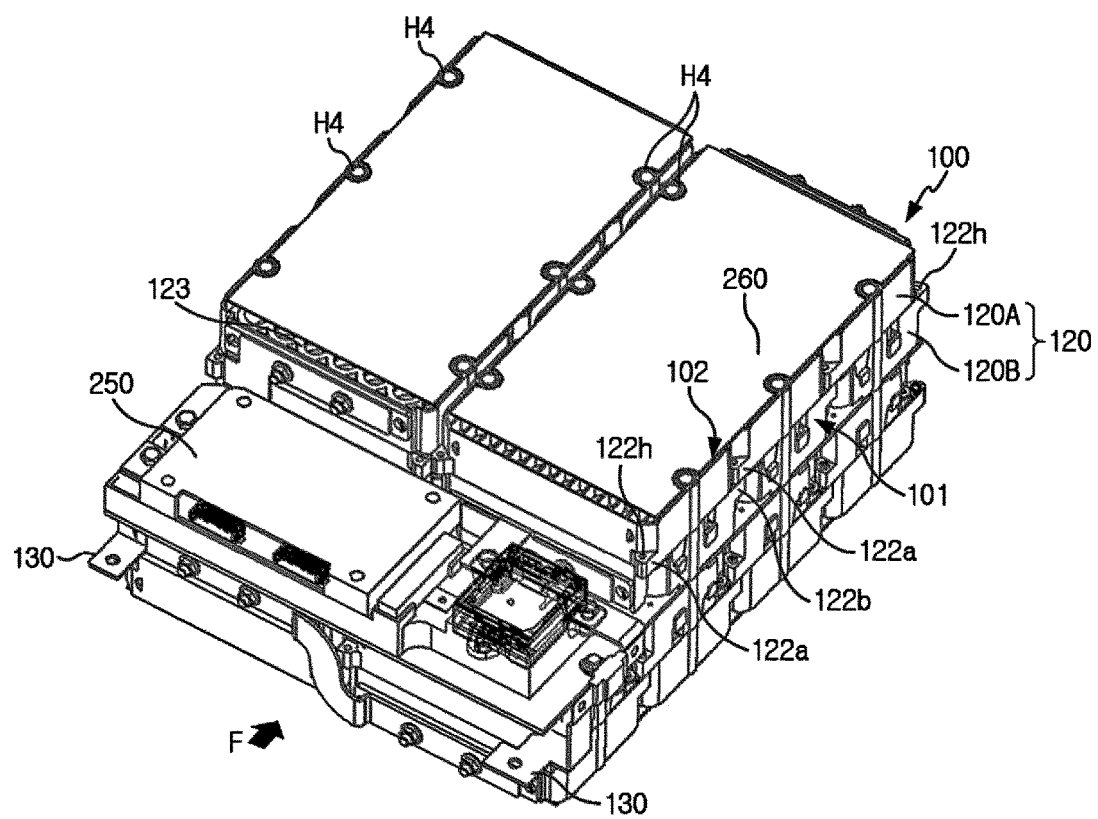
FIG. 3 is a perspective view schematically showing battery modules and an electronic component of a battery pack according to an embodiment of the present disclosure.
Figure 4:
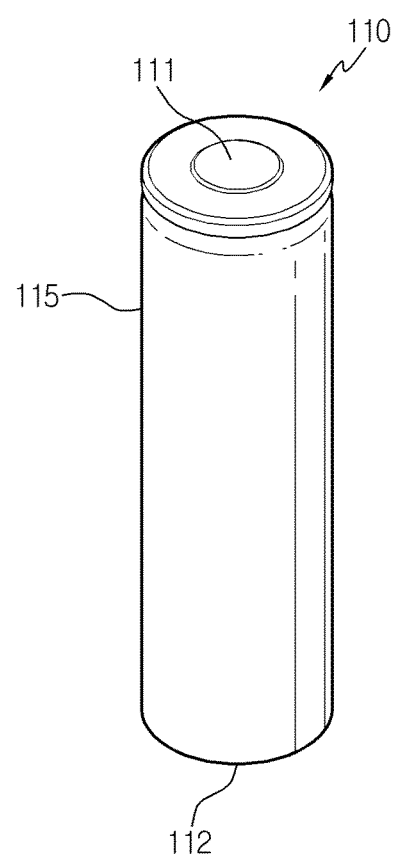
FIG. 4 is a perspective view schematically showing a battery cell of a battery pack, according to an embodiment of the present disclosure.

FIG. 1 is a perspective view schematically showing a battery pack according to an embodiment of the present disclosure. FIG. 2 is an exploded perspective view schematically showing a battery pack according to an embodiment of the present disclosure. FIG. 3 is a perspective view schematically showing battery modules and an electronic component of a battery pack according to an embodiment of the present disclosure. FIG. 4 is a perspective view schematically showing a battery cell of a battery pack, according to an embodiment of the present disclosure. Here, for convenience of description, battery cells amounted on battery modules are not shown in FIG. 3.

Referring to FIGS. 1 through 4, a battery pack 200 of the present disclosure may include at least one battery module 100.

Here, the battery module 100 may include a plurality of battery cells 110. Here, the battery cell 110 may be, for example, a cylindrical battery cell 110. However, the battery cell 110 is not limited to the cylindrical battery cell 110, and another type, for example, a pouch type battery cell 110 or an angulated battery cell 110 of a metal material may be applied.

In particular, as shown in FIG. 4, the cylindrical battery cell 110 may include a cylindrical can 115 and an electrode assembly (not shown) accommodated inside the cylindrical can 115.

Here, the cylindrical can 115 includes a material having high electric conductivity, and for example, the cylindrical can 115 may include an aluminum or copper material.

Also, the cylindrical can 115 may be configured to be erected and elongated in an up-and-down direction. Also, the cylindrical can 115 may have a cylindrical shape extending in the up-and-down direction. Moreover, electrode terminals 111 and 112 may be provided respectively at the top and the bottom of the cylindrical can 115. In particular, the first electrode terminal 111 may be provided at a flat circular top surface of the top of the cylindrical can 115 and the second electrode terminal 112 may be provided at a flat circular bottom surface of the bottom of the cylindrical can 115. Also, for example, the first electrode terminal 111 may be a positive electrode terminal and the second electrode terminal 112 may be a negative electrode terminal.

In addition, the cylindrical battery cell 110 may be arranged in a plurality of columns and rows in a horizontal direction. Here, the horizontal direction may indicate a direction parallel to the ground when the cylindrical battery cell 110 is placed on the ground, or may be at least one direction on the plane perpendicular to the up-and-down direction.

Also, the electrode assembly (not shown) may have a structure in which a positive electrode and a negative electrode are wound in a jelly-roll shape with a separator therebetween. A positive electrode tab may be attached to the positive electrode (not shown) to contact the first electrode terminal 111 at the top of the cylindrical can 115. A negative electrode tab may be attached to the negative electrode (not shown) to contact the second electrode terminal 112 at the bottom of the cylindrical can 115.

Meanwhile, a module case 120 may include an accommodating space (123) in which the cylindrical battery cell 110 is inserted and accommodated. In particular, the accommodating space 123 may have a plurality of hollow structures to surround an outer side surface of the cylindrical battery cell 110.

Moreover, the module case 120 may include an upper frame 120A and a lower frame 120B.

Here, the upper frame 120A may include a first protruding fastening portion 122a and the lower frame 120B may include a second protruding fastening portion 122b.

In particular, when viewed from a direction indicated by an arrow F, the first protruding fastening portion 122a may protrude and extend forward from an outer surface of an outer side wall of the upper frame 120A. Also, when viewed from the direction indicated by the arrow F, the second protruding fastening portion 122b may protrude and extend backward from an outer surface of an outer side wall of the lower frame 120B.

Here, the terms indicating directions, such as front, back, left, right, up, and down, may vary according to a position of an observer or how a target is placed. However, in the present specification, for convenience of description, front, back, left, right, up, and down directions are distinguished based on the direction indicated by the arrow F.

Also, the first protruding fastening portion 122a and the second protruding fastening portion 122b may include a through hole 122h into which a fastening bolt (not shown) is inserted. For example, as shown in FIG. 1, the first protruding fastening portion 122a of the module case 120 may be fastened and combined to the second protruding fastening portion 122b of another battery module 101 via the fastening bolt.

Here, the through hole 122h of the first protruding fastening portion 122a may communicate with the through hole 122h of the second protruding fastening portion 122b of the lower frame 120B of the other battery module 101 such that the fastening bolt is continuously inserted. Accordingly, battery modules 100 through 102 may be arranged as the first protruding fastening portion 122a and the second protruding fastening portion 122b are fastened to each other by using the fastening bolt.

As such, according to such a configuration of the present disclosure, the first protruding fastening portion 122a of the upper frame 120A is bolted to the second protruding fastening portion 122b of the lower frame 120B of the other battery module 101, and thus an arrangement structure of the battery modules 100 through 102 may be prevented from being in disorder.

Also, the battery module 100 may include a bus bar (not shown) such that one surface contacts and is electrically connected to the electrode terminals 111 and 112 of at least two cylindrical battery cells 110 among the plurality of cylindrical battery cells 110. In particular, the bus bar may have a plate shape or a wire shape including an electrically conductive metal. Also, the bus bar may be arranged on a top surface and a bottom surface of the module case 120, and at least one region thereof may be welded to the electrode terminals 111 and 112 of the plurality of cylindrical battery cells 110.

Also, the battery pack 200 may include a heat dissipation pad 260 to facilitate heat dissipation of the battery module 100. In particular, the heat dissipation pad 260 may be located on a top end surface or a bottom end surface of the battery module 100. Also, the heat dissipation pad 260 may include an electric insulating material having high heat conductivity. Moreover, the heat dissipation pad 260 may be, for example, a silicon pad including a silicon-based material.

As shown in FIG. 3, the battery pack 200 of the present disclosure includes total fourteen (14) battery modules 100. In particular, the total fourteen battery modules 100 are stacked in two stages. In the first stage, the 8 battery modules 100 may be fastened and combined to each other via a bolt 230, and in the second stage, the 6 battery modules 100 may be fastened and combined to each other via the bolt 230.

Figure 5:
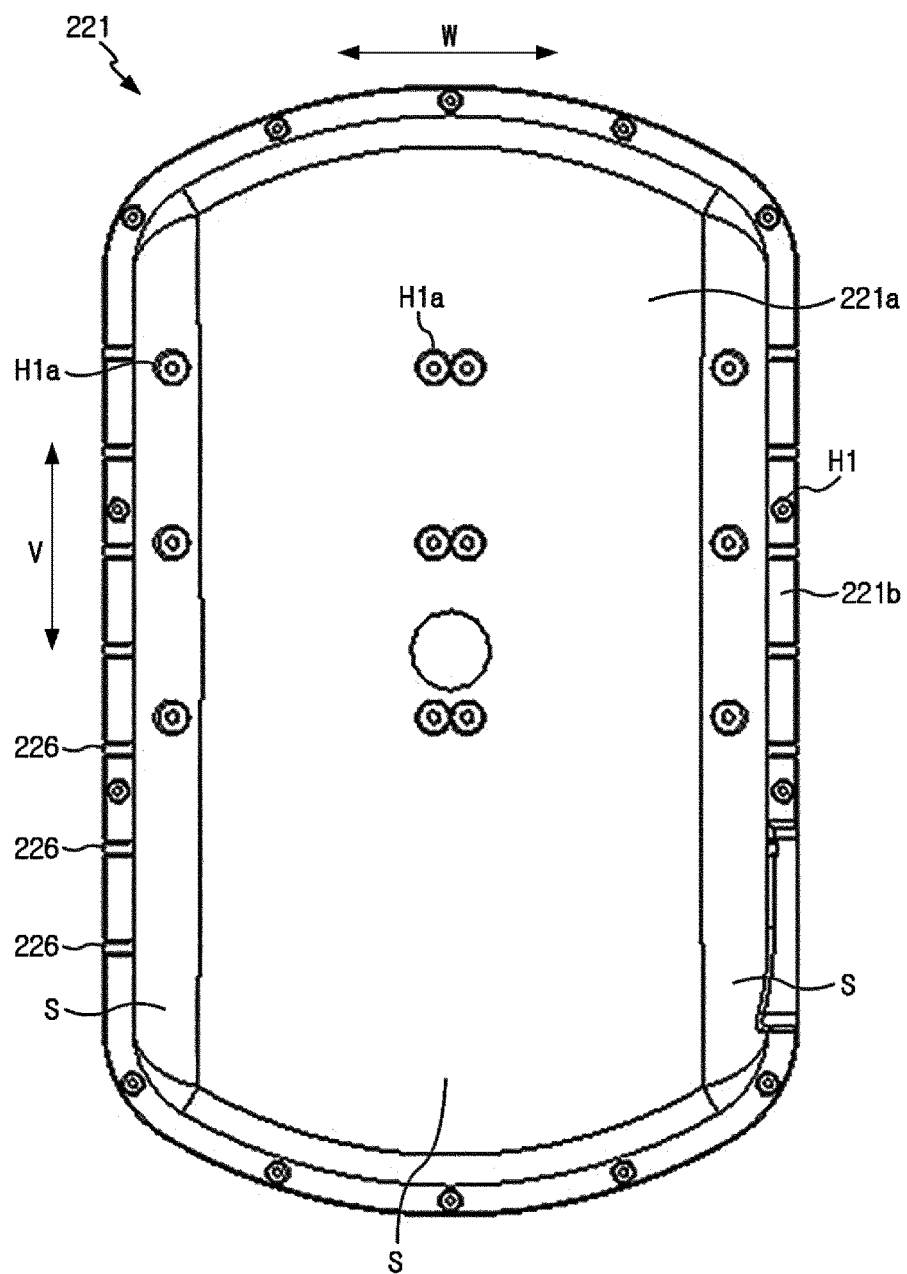
FIG. 5 is a plan view schematically showing an upper case of a battery pack, according to an embodiment of the present disclosure.

FIG. 5 is a plan view schematically showing an upper case of a battery pack, according to an embodiment of the present disclosure. Also, FIG. 6 is a bottom view schematically showing an upper case of a battery pack, according to an embodiment of the present disclosure.

Figure 6:
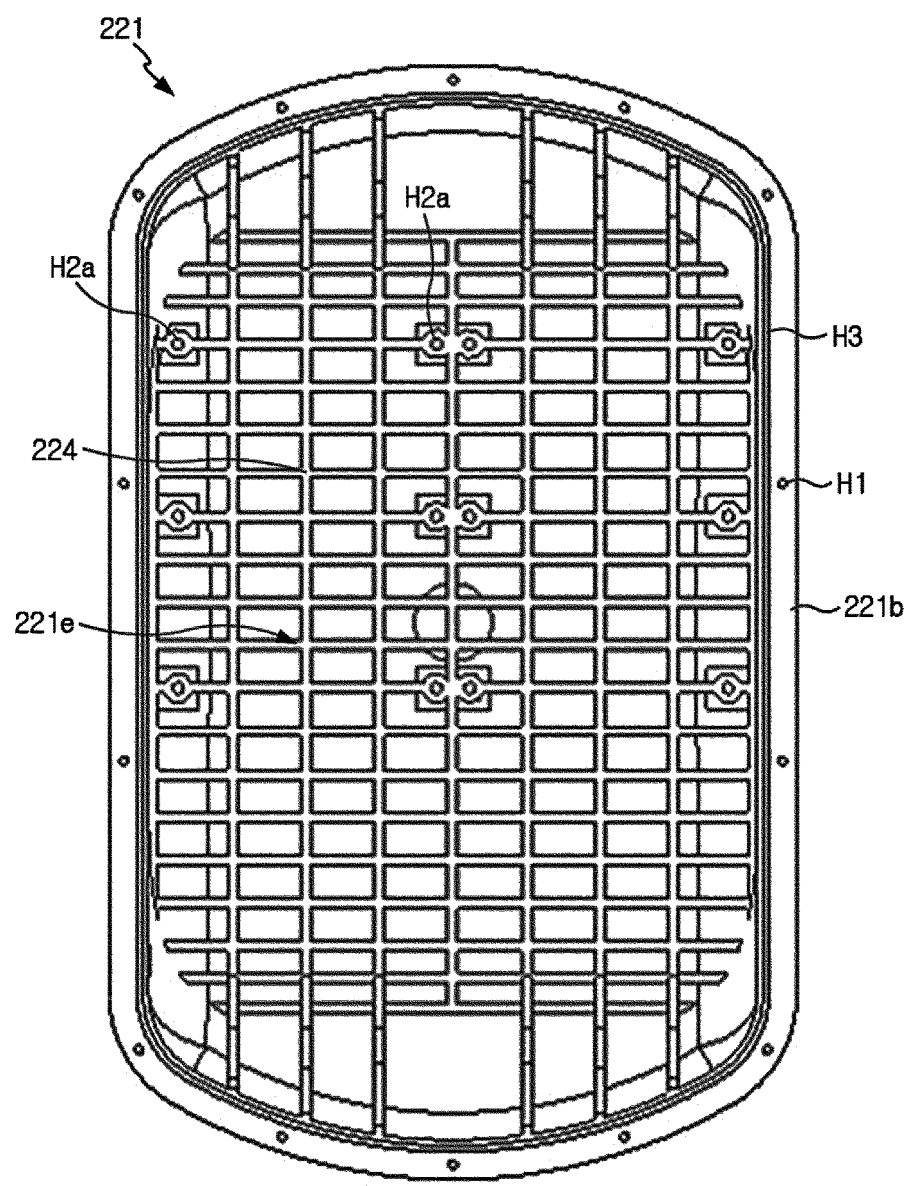
FIG. 6 is a bottom view schematically showing an upper case of a battery pack, according to an embodiment of the present disclosure.

Referring to FIGS. 5 and 6 together with FIGS. 1 and 2 again, the battery pack 200 of the present disclosure includes a pack housing 220 including an upper case 221 and a lower case 225.

Here, the upper case 221 may include an electric insulating material. Also, the upper case 221 may include, for example, an electric insulating plastic material. In addition, the upper case 221 may be formed via injection molding. Moreover, the upper case 221 may have an internal structure 221e to cover the top portion of the plurality of battery modules 100. In other words, the internal structure 221e of the upper case 221 may have the volume capable of accommodating the top portion of the battery module 100. Also, the upper case 221 may include a cover portion 221a having an external structure having a curved surface S entirely from one end to the other end.

For example, as shown in FIG. 5, the upper case 221 may include the cover portion 221a to have 9 curved surfaces S. Moreover, the upper case 221 may be longer in a front-and-back direction indicated by arrows V than in a left-and-right direction indicated by arrows W.

Figure 7:
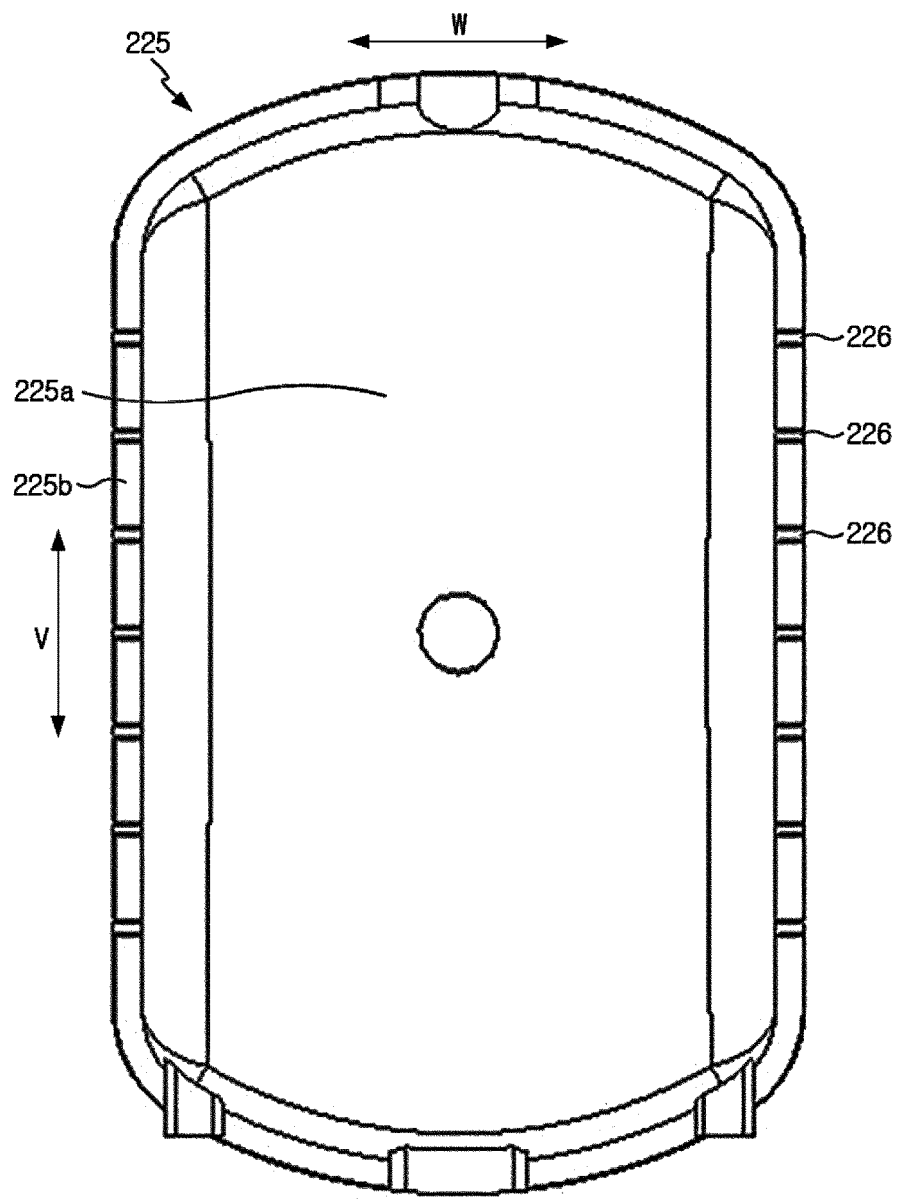
FIG. 7 is a bottom view schematically showing a lower case of a battery pack, according to an embodiment of the present disclosure.

FIG. 7 is a bottom view schematically showing a lower case of a battery pack, according to an embodiment of the present disclosure. Also, FIG. 8 is a plan view schematically showing a lower case of a battery pack, according to an embodiment of the present disclosure.

Figure 8:
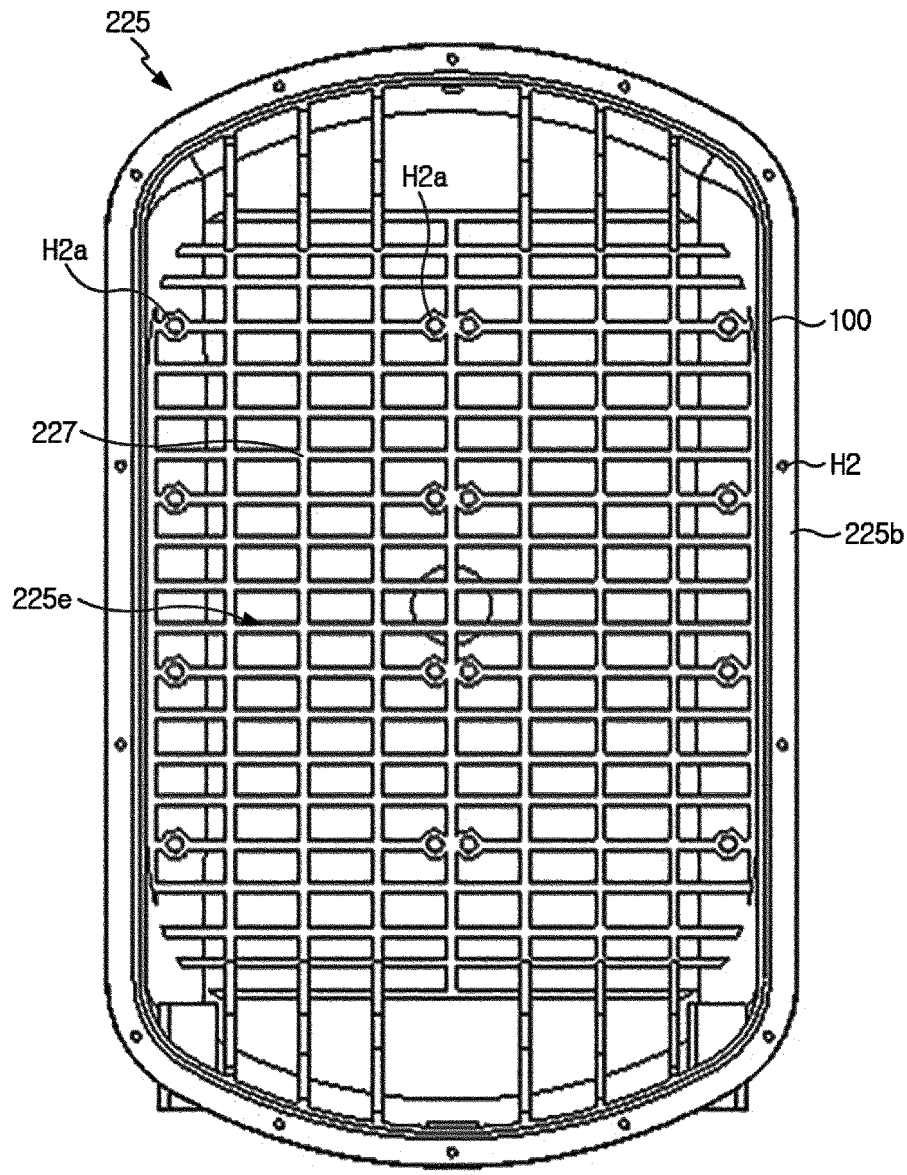
FIG. 8 is a plan view schematically showing a lower case of a battery pack, according to an embodiment of the present disclosure.

Referring to FIGS. 7 and 8 together with FIGS. 1 and 2 again, the lower case 225 may include an electric insulating material. Also, the lower case 225 may include, for example, an electric insulating plastic material. Also, the lower case 225 may be formed via injection molding.

In addition, the lower case 225 may include an internal structure 225e surrounding the bottom of the plurality of battery modules 100. In other words, the internal structure 225e of the lower case 225 may have capacity capable of accommodating the bottom of the battery module 100. Also, the lower case 225 may include a mounting portion 225a having an external structure having a curved surface entirely from one end to the other end.

For example, as shown in FIG. 7, the lower case 225 may be configured such that the mounting portion 225a has nine (9) curved surfaces on the outer surface. Moreover, the lower case 225 may be longer in the front-and-back direction indicated by the arrows W than in the left-and-right direction indicated by the arrows W.

Also, the upper case 221 and the lower case 225 may be combined with each other such that the inside of the pack housing 220 maintains a negative pressure state. In other words, the bottom of the upper case 221 and the top of the lower case 225 may be closely combined to each other to be sealed from the outside. At this time, the inside of the pack housing 220 where the plurality of battery modules 100 are accommodated may be relatively in the negative pressure state compared with the atmospheric pressure.

As such, according to such a configuration of the present disclosure, the pack housing 220 includes the upper case 221 and the lower case 225 respectively including the cover portion 221a and the mounting portion 225a, which have the curved surface entirely on the external structure, and thus when deformation of the pack housing 220 caused by negative pressure may be effectively prevented when the inside of the sealed pack housing 220 is in the negative pressure state.

In other words, in a case where the pack housing 220 has a shape of quadrangular box in overall, since negative pressure is concentrated at a center region of an upper surface and a lower surface of a housing that is plane compared with a corner portion of the quadrangular box, the center region is vulnerable to a deformation force, and thus deformation easily occurs due to negative pressure. On the other hand, the pack housing 220 having the curved surface in overall as in the present disclosure may effectively prevent deformation caused by negative pressure because deformation force according to negative pressure is uniformly distributed throughout the curved surface.

Referring back to FIGS. 1 and 2 again, the upper case 221 may include a first edge portion 221b formed along a bottom end surface of the cover portion 221a, and protruding and extending in an outward direction. In other words, the first edge portion 221b may have an oval shape in overall on a plane (ground surface) when viewed from bottom to top. Also, the first edge portion 221b may have a predetermined thickness in the up-and-down direction.

Also, the lower case 225 may include a second edge portion 225b formed along a top end surface of the mounting portion 225a, and protruding and extending in the outward direction. In other words, the second edge portion 225b may have an oval shape in overall on the plane. Also, the second edge portion 225b may have a predetermined thickness in the up-and-down direction.

Moreover, the first edge portion 221b and the second edge portion 225b may be combined with each other such that the inside of the pack housing 220 maintains the negative pressure state. In particular, a bottom surface of the first edge portion 221b and a top surface of the second edge portion 225b may be combined with each other. At this time, the first edge portion 221b and the second edge portion 225b may be bolted by using, for example, the bolt 230 of FIG. 2.

Moreover, the first edge portion 221b of the upper case 221 may include a fastening hole H1 configured for bolting. Also, the second edge portion 225b of the lower case 225 may include a fastening groove H2 at a location corresponding to the fastening hole H1 in the up-and-down direction. In addition, a male screw may be formed at the bottom of the bolt 230 and a female screw may be formed at the fastening groove H2.

In other words, the bottom of the bolt 230 may be coupled via screw connection formed on the fastening groove H2. Also, a head of the bolt 230 may be set to be larger than the diameter of the fastening hole H1 such that the head of the bolt 230 is prevented from being inserted into the fastening hole H1.

For example, as shown in FIG. 5, fourteen (14) fastening holes H1 may be formed at the first edge portion 221b of the upper case 221. Also, for example, as shown in FIG. 8, the 14 fastening grooves H2 may be formed at the second edge portion 225b of the lower case 225. Also, the 14 fastening holes H1 and the 14 fastening grooves H2 may be provided at locations corresponding in the up-and-down direction. Also, the battery pack 200 of the present disclosure may include the 14 bolts 230.

As such, according to such a configuration of the present disclosure, the pack housing 220 of the present disclosure may be effectively sealed by inserting the bolt 230 into the fastening hole H1 and the fastening groove H2 provided at the first edge portion 221b and the second edge portion 225b. In addition, sealability of the pack housing 220 may be effectively increased by combining the bottom surface of the first edge portion 221b and the top surface of the second edge portion 225b, which have predetermined areas, to face each other.

Figure 9:
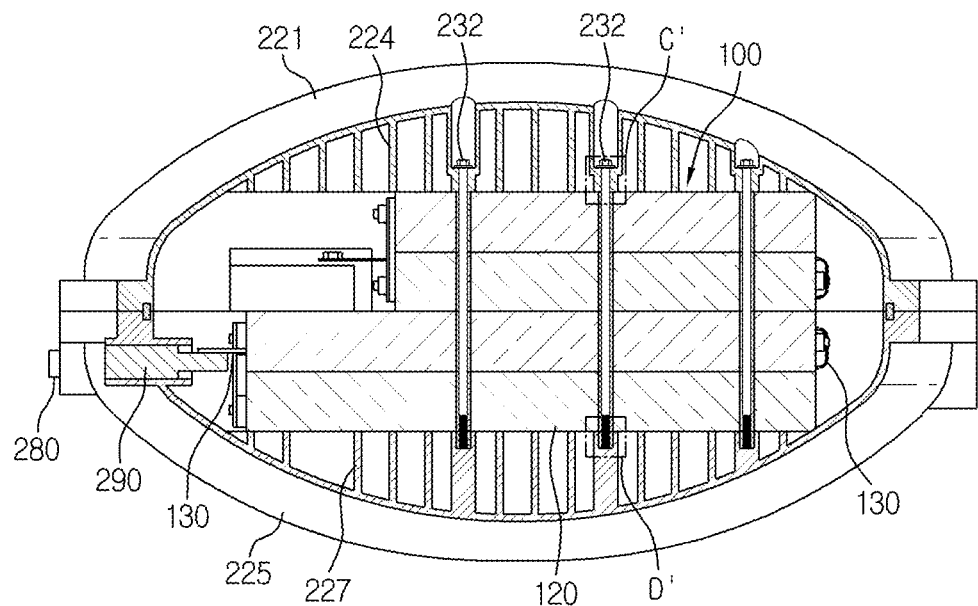
FIG. 9 is a side cross-sectional view taken along a line B-B' of FIG. 1.
Figure 10:
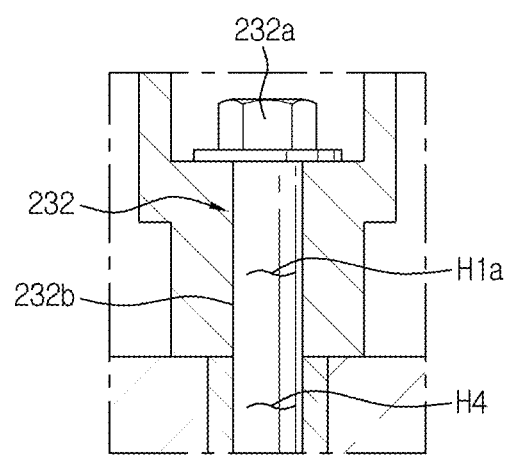
FIG. 10 is a partial side cross-sectional view schematically showing a region C' of FIG. 9.

FIG. 9 is a side cross-sectional view taken along a line B-B' of FIG. 1. FIG. 10 is a partial side cross-sectional view schematically showing a region C' of FIG. 9. Also, FIG. 11 is a partial side cross-sectional view schematically showing a region D' of FIG. 9.

Figure 11:
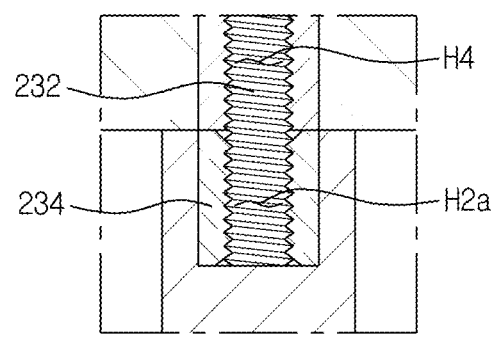
FIG. 11 is a partial side cross-sectional view schematically showing a region D' of FIG. 9.

Referring to FIGS. 9 through 11 together with FIGS. 6 and 8, a support portion 224 may be provided at the internal structure 221e of the upper case 221. In particular, the support portion 224 may be a structure protruding and extending from an inner top surface of the upper case 221 in an inward direction to support the battery module 100 accommodated inside the pack housing 220. Also, the support portion 224 may have different lengths protruding and extending in the inward direction according to a distance between an inner top surface of the cover portion 221a of the upper case 221 and the outer surface of the battery module 100. Moreover, the support portion 224 may linearly extend in the horizontal direction or may be connected while crossing each other. For example, the support portion 224 may have a lattice shape on the plane.

Also, a support portion 227 may also be provided at the internal structure 225e of the lower case 225. In particular, the support portion 227 may be a structure protruding and extending from an inner bottom surface of the lower case 225 in the inward direction t support the battery module 100 accommodated in the pack housing 220. Also, the support portion 227 may have different lengths protruding and extending in the inward direction according to a distance between an inner bottom surface of the mounting portion 225a of the lower case 225 and the battery module 100. Moreover, the support portion 227 may linearly extend in the horizontal direction or may be connected while crossing each other. For example, the support portion 227 may have a lattice shape on the plane.

As such, according to such a configuration of the present disclosure, by providing the support portions 224 and 227 respectively at the internal structures of the upper case 221 and the lower case 225, the position of the battery module 100 may be stably fixed inside the pack housing 220. Moreover, since the support portion 224 of the upper case 221 and the support portion 227 of the lower case 225 support the plurality of battery modules 100 at corresponding locations while the plurality of battery modules 100 are arranged therebetween, the support portions 224 and 227 may prevent deformation of the pack housing 220 in the inward direction caused by negative pressure generated inside the pack housing 220.

Referring to FIGS. 9 through 11 together with FIG. 2, the battery pack 200 may include at least one long bolt 232 configured such that the upper case 221, the battery module 100, and the lower case 225 are combined and fixed to each other.

In particular, the upper case 221 may include a fastening hole H1a into which the long bolt 232 is inserted. In addition, the module case 120 of the battery module 100 may include a through hole H4 of FIG. 3 into which a pillar portion 232b of the long bolt 232 is inserted. Also, a fastening groove H2a configured such that the bottom of the long bolt 232 is inserted and fixed may be provided at the lower case 225. Here, an insert nut 234 including a female screw engaged and combined with a male screw at the bottom of the long bolt 232 may be inserted into the fastening groove H2a.

For example, as shown in FIG. 2, the battery pack 200 may include the 12 long bolts 232. Also, the 12 fastening holes H1a configured such that the pillar portion 232b of the long bolt 232 is inserted may be provided at the cover portion 221a. Moreover, as shown in FIG. 3, the 12 through holes H4 configured such that the pillar portion 232b of the long bolt 232 is inserted may be provided at the module case 120 of the battery module 100. Also, as shown in FIG. 6, the 12 fastening grooves H2a configured such that the bottom of the long bolt 232 is inserted and fixed may be provided.

Also, an elastic ring (not shown) for sealing of the fastening hole H1a may be provided at a bottom surface of a head 232a of the long bolt 232. For example, the elastic ring may be provided via a method of coating a melted silicon material at the bottom surface of the head 232a of the long bolt 232 and then hardening the silicon material. Alternatively, the elastic ring may be located at the bottom of the head 232a by being inserted along the pillar portion 232b.

As such, according to such a configuration of the present disclosure, since the battery pack 200 of the present disclosure includes the at least one long bolt 232 configured such that the upper case 221, the battery module 100, and the lower case 225 are combined and fixed to each other, not only the coupling of the upper case 221 and the lower case 225 are stably maintained, but also the plurality of battery modules 100 accommodated inside the pack housing 220 are pressurized and fixed in the up-and-down direction by the upper case 221 and the lower case 225, and thus movement of the battery module 100 inside the pack housing 220 may be effectively prevented.

Referring to FIG. 9 together with FIGS. 1 and 3 again, the battery pack 200 may further include a communication connector 280. The communication connector 280 may be configured to be electrically connected to an external device (not shown) to verify a charged state or output state of the battery module 100. Also, the communication connector 280 may be electrically connected to an electronic component 250 through a signal transmission cable (not shown).

The battery pack 200 may include an external input and output terminal 290. In particular, the battery pack 200 may include the two external input and output terminals 290. The external input and output terminal 290 may include an electric insulating metal. For example, the external input and output terminal 290 may include aluminum, copper, nickel, or the like.

Moreover, the external input and output terminal 290 may be electrically connected to an external bus bar 130 electrically connected to the plurality of battery cells 110 provided in the battery modules 100. Accordingly, the battery pack 200 may transmit electricity through the external input and output terminal 290 to supply power to the external device. In this case, the external input and output terminal 290 may be inserted into one region of the pack housing 220 via an insert injection method during manufacture of the pack housing 220.

Figure 12:
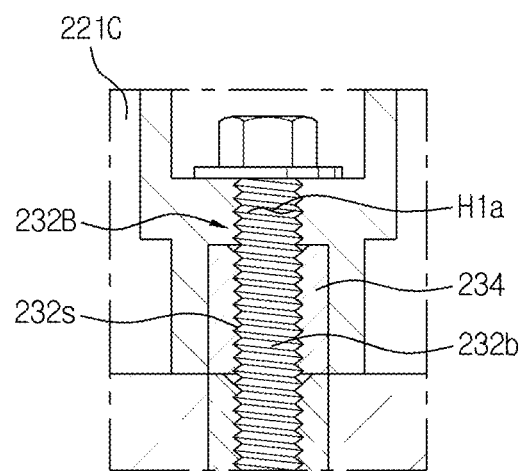
FIG. 12 is a partial side cross-sectional view schematically showing a region of a battery pack according to another embodiment of the present disclosure.

FIG. 12 is a partial side cross-sectional view schematically showing a region of a battery pack according to another embodiment of the present disclosure.

Referring to FIG. 12, in an upper case 221C of a battery pack according to another embodiment, the insert nut 234 may be additionally inserted into the fastening hole H1 provided at the cover portion 221a, compared with the upper case 221 of FIG. 9. Also, compared with the long bolt 232 of FIG. 9, the battery pack according to another embodiment may include a long bolt 232B additionally having a male screw 232s at the top of the pillar portion 232b.

In other words, the battery pack according to another embodiment may include the insert nut 234 at the fastening groove H2a of the lower case 225 as shown in FIG. 9, and in addition, include the insert nut 234 at the fastening hole H1 of the upper case 221C. Also, a male screw 233a may be provided at each of the top and the bottom of a pillar portion 232b of the long bolt 232 of FIG. 12. Accordingly, the battery pack of FIG. 12 may be inserted and fixed to the insert nut 234 of the upper case 221C and the insert nut 234 of the lower case 225 by using the long bolt 232B.

As such, according to such a configuration of the present disclosure, since the battery pack according to another embodiment binds the movement of the upper case 221 both in the inward direction and the outward direction by using the long bolt 232 having a screw at each of the top and the bottom, not only sealability of the pack housing may be stably maintained, but also contraction of the pack housing in the inward direction due to negative pressure inside the pack housing may be prevented. Such contraction prevention of the pack housing prevents a gap from being generated between the long bolt 232B and the fastening hole H1, and thus the sealability of the pack housing may be effectively improved.

Figure 13:
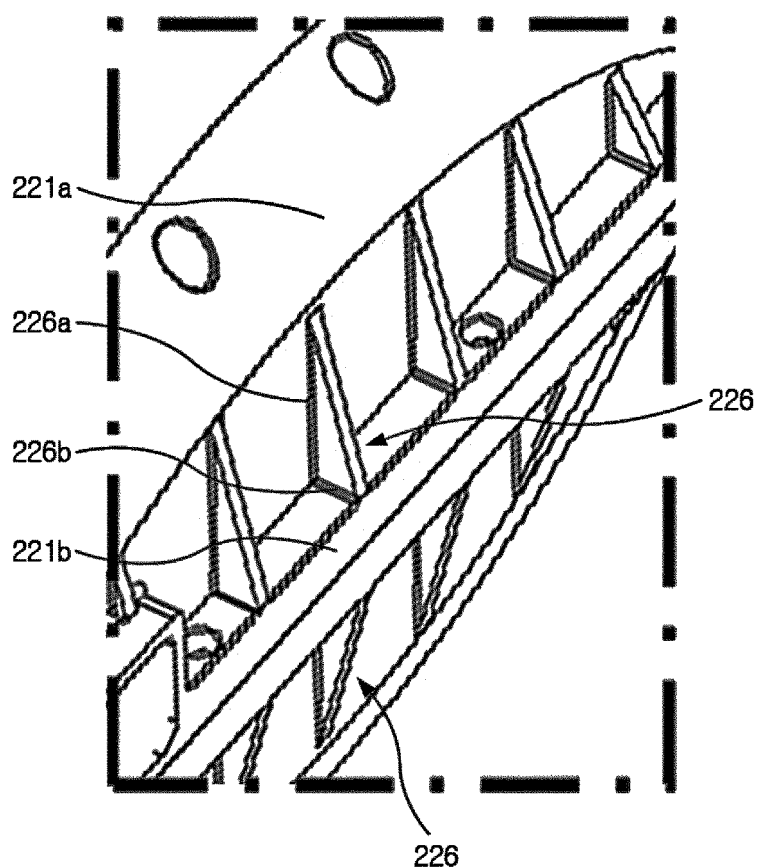
FIG. 13 is a partial enlarged view schematically showing a region A' of FIG. 1.

FIG. 13 is a partial enlarged view schematically showing a region A' of FIG. 1. Referring to FIG. 13 together with FIGS. 1 and 2, a rib 226 may be provided at the external structure of the upper case 221. In particular, the rib 226 may protrude and extend from the outer surface of the cover portion 221a of the upper case 221. More particularly, the rib 226 may have an inner side of the horizontal direction connected to the outer surface of the cover portion 221a and have a bottom end portion connected to an outer surface (top surface) of a portion of the first edge portion 221b protruding in the outward direction.

The rib 226 may have a shape in which a width in the left-and-right direction is continuously reduced in the upward direction. In other words, when viewed in the direction indicated by the arrow F, the rib 226 may have a triangular shape. Moreover, the rib 226 may have various sizes based on a degree of reinforcement required at a formed region. For example, the rib 226 located at the inner side of the upper case 221 may be larger than the rib 226 located at the outer side. For example, as shown in FIG. 5, the 12 ribs 226 may be provided at both sides of the upper case 221 in the left-and-right direction.

Also, referring to FIGS. 1 and 2, the rib 226 may also be provided at the outer surface of the external structure of the mounting portion 225a of the lower case 225. In particular, the rib 226 may protrude and extend from the outer surface of the external structure of the mounting portion 225a of the lower case 225. Also, the rib 226 may have an inner side in the horizontal direction connected to the outer surface of the mounting portion 225a and a top end portion connected to the outer surface (bottom surface) of a portion of the second edge portion 225b protruding in the outward direction.

Also, the rib 226 may have a shape in which a width in the left-and-right direction is continuously reduced in the downward direction. In other words, when viewed in the direction indicated by the arrow F, the rib 226 may have an inverse triangular shape. Moreover, the rib 226 may have various sizes based on a degree of reinforcement required at a formed region. For example, the rib 226 located at the inner side of the lower case 225 may be larger than the rib 226 located at the outer side. For example, as shown in FIG. 7, the 12 ribs 226 may be provided at the lower case 225.

As such, according to such a configuration of the present disclosure, by providing the rib 226 for rigidity reinforcement at each of the upper case 221 and the lower case 225, rigidity of a region of the pack housing 220 having weak mechanical rigidity may be compensated for, and thus durability of a product may be effectively improved.

Figure 14:
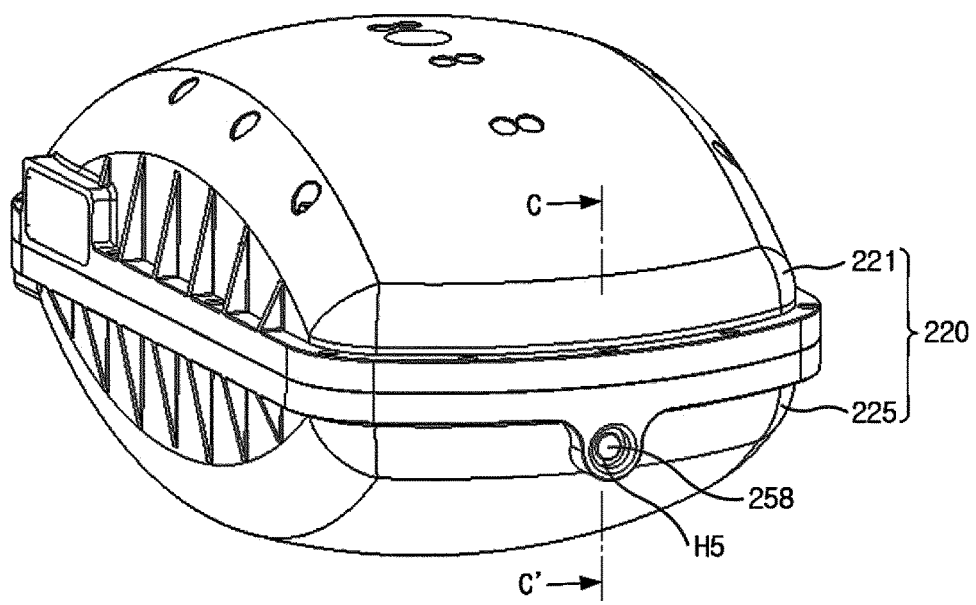
FIG. 14 is a rear perspective view schematically showing a battery pack according to an embodiment of the present disclosure.

FIG. 14 is a rear perspective view schematically showing a battery pack according to an embodiment of the present disclosure. Also, FIG. 15 is a side cross-sectional view taken along a line C-C' of FIG. 14.

Figure 15:
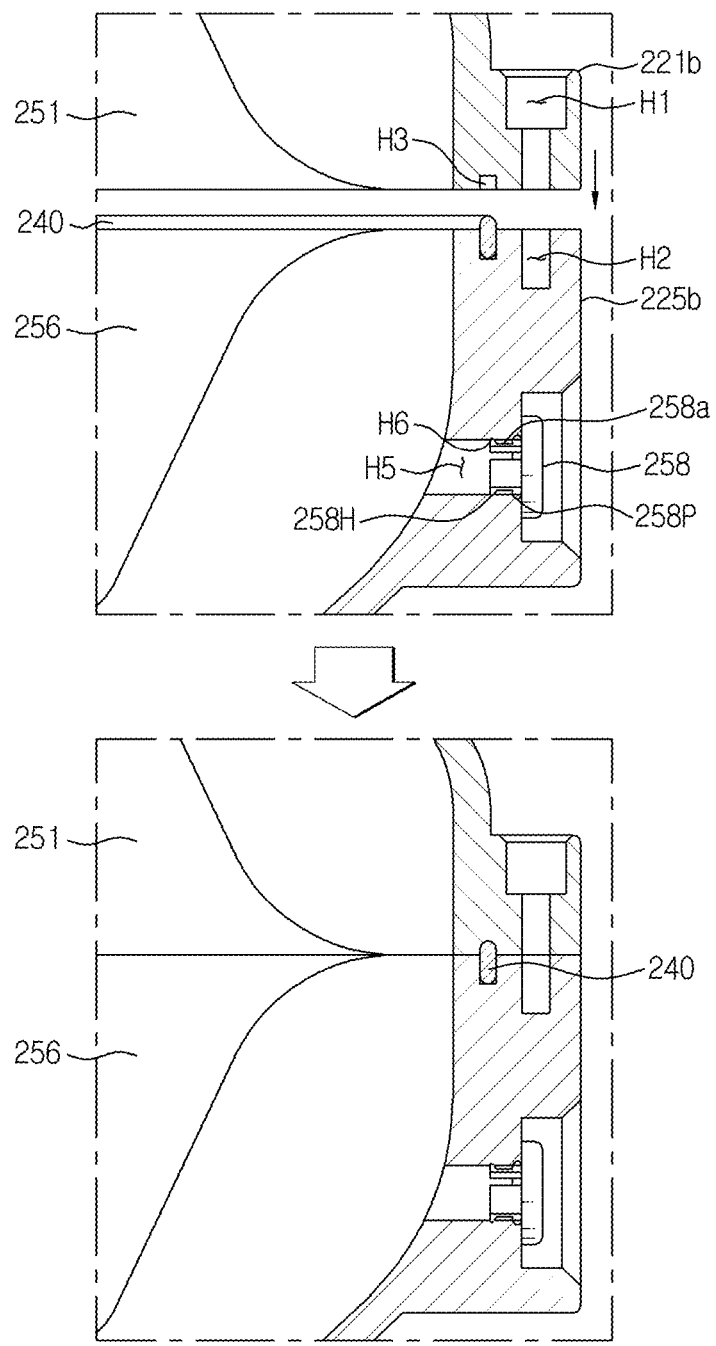
FIG. 15 is a side cross-sectional view taken along a line C-C' of FIG. 14.

Referring to FIGS. 14 and 15 together with FIG. 2, the pack housing 220 may further include a gasket 240 for sealing between the upper case 221 and the lower case 225. In particular, the gasket 240 may include a rubber material having elasticity or a plastic material having elasticity. Moreover, the gasket 240 may be arranged between the first edge portion 221b of the upper case 221 and the second edge portion 225b of the lower case 225. Also, for example, as shown in FIG. 2, the gasket 240 may continuously extend along the first edge portion 221b and the second edge portion 225b. In other words, the gasket 240 may have an oval shape on the plane.

As such, according to such a configuration of the present disclosure, since the gasket 240 is arranged between the upper case 221 and the lower case 225, sealability between the upper case 221 and the lower case 225 may be effectively increased.

Also, an insertion groove H3 into which a region of the gasket 240 is inserted may be provided at each of the first edge portion 221b and the second edge portion 225b. In particular, the insertion groove H3 may be provided at the first edge portion 221b such that the bottom of the gasket 240 is inserted. Also, the insertion groove H3 may be provided at the second edge portion 225b such that the top of the gasket 240 is inserted. Moreover, the insertion groove H3 of the first edge portion 221b and the insertion groove H3 of the second edge portion 225b may be provided at locations corresponding in the up-and-down direction. Accordingly, the first edge portion 221b and the second edge portion 225b are combined with each other and at the same time, the gasket 240 may be inserted into the insertion groove H3 of each of the first edge portion 221b and the second edge portion 225b.

As such, according to such a configuration of the present disclosure, by providing the insertion groove H3 at each of the first edge portion 221b and the second edge portion 225b, the gasket 240 may be stably fixed between the first edge portion 221b and the second edge portion 225b, and thus the gasket 240 may be effectively prevented from being detached from the pack housing 220, and from being deformed or damaged.

Referring back to FIGS. 14 and 15, the pack housing 220 may include a vent hole H5. In particular, the vent hole H5 may be configured to be connected to a suction hose of a vacuum pump (not shown). In other words, the vent hole H5 may be configured to be connected to the suction hose of the vacuum pump so as to add vacuum pressure inside the pack housing 220. Also, the vacuum pump may suck internal air such that predetermined vacuum pressure is formed in a space of the pack housing 220 where the battery module 100 is accommodated.

For example, as shown in FIG. 14, the battery pack 200 of the present disclosure may include the vent hole H5 at the rear end of the pack housing 220. Also, the vent hole H5 may be provided at an extending portion of the pack housing 220, which is connected to the second edge portion 225b of the lower case 225 and extends in the downward direction.

As such, according to such a configuration of the present disclosure, since the inside of the pack housing 220 of the battery pack 200 of the present disclosure is able to maintain a state in which air is discharged by the vacuum pump, the inside of the pack housing 220 is able to maintain an anaerobic state having less air than the outside, and thus an ignition or explosion caused by malfunction of battery cells embedded in the battery module 100 may be prevented.

Also, the vent hole H5 may be sealed by a cap 258 such that negative pressure is stably maintained and inflow of external air is prevented after predetermined negative pressure is formed inside the pack housing 220 compared to atmospheric pressure of the external air. In particular, an O-ring 258P may be provided at the cap 258 to increase the sealability of the vent hole H5. In other words, the O-ring 258P may be provided at a pillar portion 258a of the cap 258. The O-ring 258P may include, for example, a rubber material.

As such, according to such a configuration of the present disclosure, when the vent hole H5 is sealed by the cap 258 having the O-ring (258P), the sealability is excellent, and thus the negative pressure inside the pack housing 220 may be stably maintained.

Also, a hook structure 258H may be provided at one end of the pillar portion 258a of the cap 258 in the inward direction. Also, the hook structure 258H may be provided to be hooked at a hooking groove H6 recessed concavely at an internal structure of the vent hole H5.

As such, according to such a configuration of the present disclosure, when the cap 258 having the hook structure 258H is used to seal the vent hole H5, the cap 258 may be prevented from being separated due to an internal pressure increase or an external impact of the pack housing 220.

Also, the pillar portion 258a of the cap 258 may have a branched structure divided into at least two portions. The pillar portion 258a may be elastically inserted into the vent hole H5 through the at least two divided structures.

As such, according to such a configuration of the present disclosure, by applying the cap 258 having the branched structure to seal the vent hole H5, the cap 258 may be easily inserted and fixed to the vent hole H5, and thus manufacturing efficiency may be effectively increased.

Referring back to FIGS. 1 and 2, the battery pack 200 according to the present disclosure may include the electronic component 250 for controlling charging and discharging of the battery module 100, in addition to the battery module 100. For example, the battery pack 200 may further include a battery management system (BMS), a current sensor, a fuse box 270, and the like.

Also, the battery pack 200 may include a cooling device for appropriately managing the temperature of the battery module 100, in addition to an assembly of the plurality of battery modules 100 and the electronic components 250 for operating the plurality of battery modules 100, for example, other components such as a heat dissipation plate, a cooling tube, a cooling water duct, and the like.

Also, the battery pack 200 according to the present disclosure may be applied to an energy storage device or applied to a vehicle, such as an electric vehicle or a hybrid vehicle. In other words, the vehicle according to the present disclosure may include the battery pack 200.

For example, a device may include the battery pack 200. The device may be the energy storage device. Also, the energy storage device may be included in an energy storage system together with a control device for controlling the energy storage device and a communicating device communicating with an external device.

Meanwhile, in the present specification, the terms indicating directions, such as up, down, left, right, front, and back, are used but it would be obvious to one of ordinary skill in the art that the terms are used only for convenience of description and may vary according to a position of a target object, a position of an observer, or the like.

While the present disclosure has been particularly shown and described with reference to exemplary embodiments thereof, it will be understood by those of ordinary skill in the art that various changes in form and details may be made therein without departing from the scope of the present disclosure as defined by the following claims.

LIST OF REFERENCE NUMERALS

| | |
|---|---|
| Battery Pack: 200 | Battery Cell: 110 |
| Battery Module: 100 | Module Case: 120 |
| Pack Housing: 220 | Upper Case: 221 |
| Cover Portion: 221a | First Edge Portion: 221b |
| Lower Case: 225 | Mounting Portion: 225a |
| Second Edge Portion: 225b | Rib: 226 |
| Fastening Hole: H1 | Bolt: 230 |
| Fastening Groove: H2 | Long Bolt: 232 |
| Gasket: 240 | Insertion Groove: H3 |
| Vent Hole: H5 | Cap: 258 |
| Support Portion: 224, 227 | |

INDUSTRIAL APPLICABILITY

The present disclosure relates to a battery pack including a pack housing. Also, the present disclosure is applicable to industries related to electronic devices or vehicles including the battery pack.

What is claimed is:

1. A battery pack, comprising:
at least one battery module including a plurality of battery cells and a module case having an accommodating space to accommodate the plurality of battery cells therein; and
a pack housing including:
an upper case that has an internal structure to cover a top portion of the at least one battery module and includes a cover portion having an external structure having a curved surface entirely from one end to another end, and
a lower case that has an internal structure to surround a bottom portion of the at least one battery module and includes a mounting portion having an external structure having a curved surface entirely from one end to another end,
wherein the upper case and the lower case are combined with each other and sealed to maintain an inside of the pack housing in a negative pressure state compared with an external atmospheric pressure, wherein the upper case comprises a first edge portion provided along a bottom end surface of the cover portion and protruding and extending in an outward direction, wherein the lower case comprises a second edge portion provided along a top end surface of the mounting portion and protruding and extending in the outward direction, and wherein the first edge portion and the second edge portion are combined to each other to maintain the inside of the pack housing in the negative pressure state.

2. The battery pack of claim 1, wherein the upper case includes a rib protruding and extending from an outer surface of an external structure of the upper case, having one side in a horizontal direction connected to an outer surface of the cover portion, and having a bottom end portion connected to a top surface of a portion of the first edge portion protruding in the outward direction, and the lower case includes a rib protruding and extending from an outer surface of an external structure of the lower case, having one side in the horizontal direction connected to an outer surface of the mounting portion, and having a top end portion connected to a bottom surface of a portion of the second edge portion protruding in the outward direction.

3. The battery pack of claim 1, wherein the upper case includes a fastening hole configured to be bolted, the module case includes a through hole into which a bolt is inserted, and the lower case includes a fastening groove at a location corresponding to the fastening hole in an up-and-down direction.

4. The battery pack of claim 3, wherein the battery pack further comprises at least one long bolt configured to combine and fix the upper case, the at least one battery module, and the lower case to each other.

5. The battery pack of claim 1, wherein the pack housing further comprises a gasket provided between the first edge portion of the upper case and the second edge portion of the lower case.

6. The battery pack of claim 5, wherein the first edge portion and the second edge portion each include an insertion groove into which a region of the gasket is inserted.

7. The battery pack of claim 1, wherein a vent hole configured to be connected to a suction hose of a vacuum pump or sealed by a cap to prevent inflow of external air is provided at the pack housing.

8. A device comprising the battery pack of claim 1.

9. An energy storage system comprising the device of claim 8.

10. The battery pack of claim 1, wherein the curved surface of the upper case has a first curvature extending in an upward direction, and the curved surface of the lower case has a second curvature extending in a downward direction.

* * * * *